(12) United States Patent
Liebmann, Jr.

(10) Patent No.: US 6,595,109 B2
(45) Date of Patent: Jul. 22, 2003

(54) WINE PRESERVING ASSEMBLY

(76) Inventor: George W. Liebmann, Jr., P.O. Box 482, Hanover, NH (US) 03755

( * ) Notice: Subject to any disclaimer, the term of this patent is extended or adjusted under 35 U.S.C. 154(b) by 0 days.

(21) Appl. No.: 10/082,031

(22) Filed: Feb. 21, 2002

(65) Prior Publication Data

US 2002/0117055 A1 Aug. 29, 2002

Related U.S. Application Data

(60) Provisional application No. 60/271,147, filed on Feb. 23, 2001.

(51) Int. Cl.$^7$ .......................... B65B 31/00; B65B 83/14
(52) U.S. Cl. ................... 99/323; 261/DIG. 7; 261/52; 141/59; 141/64; 99/277.1
(58) Field of Search .............................. 99/323.1, 277.1, 99/276, 323.2; 261/DIG. 7, DIG. 65, 52; 141/64, 19, 98, 59

(56) References Cited

U.S. PATENT DOCUMENTS

| 4,473,174 A | | 9/1984 | Heuser .................. 222/152 |
| 4,867,209 A | * | 9/1989 | Santoiemmo ......... 99/323.1 X |
| 5,566,730 A | | 10/1996 | Liebmann, Jr. .............. 141/64 |

FOREIGN PATENT DOCUMENTS

GB            2217787            11/1989

* cited by examiner

Primary Examiner—Reginald L. Alexander
(74) Attorney, Agent, or Firm—Watov & Kipnes, P.C.

(57) ABSTRACT

A wine preserving assembly which simultaneously delivers an inert-gas to the headspace of a wine bottle while simultaneously evacuating undesirable gas contained in the headspace through the action of operatively engaging an inert gas-containing vessel to the wine preserving assembly.

1 Claim, 5 Drawing Sheets

WINE PRESERVING ASSEMBLY

This application claims the benefit of U.S. Provisional Application No. 60/271,147 filed Feb. 23, 2001.

FIELD OF THE INVENTION

The present invention is generally directed to a wine preserving assembly for insertion into a bottle of wine which enables an inert gas to be injected into the headspace of a bottle of wine while simultaneously enabling the evacuation of air contained within the headspace from the bottle of wine. The simultaneous injection-evacuation process is initiated solely by operatively engaging an inert gas-containing cannister into the wine preserving assembly which is seated in the neck of the bottle. The wine preserving assembly is used after a bottle of wine is opened and can add significant shelf life to an open bottle of wine.

BACKGROUND OF THE INVENTION

It is well known that any oxygen-containing gas (e.g. air) can adversely effect the taste and character of wine over time and in some cases within just a day or two. As a result, air contained within the headspace of a wine bottle (i.e. the space between the wine remaining in the bottle and the base of the cork) instigates complex chemical reactions with the wine. These chemical reactions may adversely effect the taste of the wine and can may result in partially filled bottles or even full bottles of wine being discarded.

There have been efforts to replace the air contained within a bottle of wine after it is opened with an inert gas. Inert gases are those gases which do not contain a material amount of oxygen gas and therefore do not instigate chemical reactions with the wine contained in a wine bottle. However, many of these devices have proven awkward to use and/or have not been successful in enabling the consumer to readily preserve the wine in a bottle with an easy to operate and safe device which can both inject an inert gas into the headspace of a wine bottle and simultaneously remove any oxygen-containing gas therein.

SUMMARY OF THE INVENTION

The present invention is generally directed to a wine preserving assembly which may be easily inserted into the neck of a bottle and which can provide an inert gas into the headspace of a bottle while simultaneously evacuating the air contained within the headspace in a safe and effective manner that can be readily accomplished by the purchaser of a bottle of wine without awkward and/or multiple operations or difficult to use equipment.

In a particular aspect of the present invention, there is provided a wine preserving assembly comprising:

a) a housing having a lower housing portion, a middle housing portion and an upper housing portion, said lower housing portion being insertable into the neck of a wine bottle;

b) said upper housing portion having an opening for releasably receiving an inert gas-containing vessel and being separated from the middle housing portion by at least one pathway;

c) a pin adapted to penetrate the inert gas-containing vessel and to deliver the inert gas to a piston assembly;

d) a first passageway for delivering at least a portion of the inert gas from the piston assembly through an opening in the lower housing portion; and e) said piston assembly upon contact with the inert gas, moving to a position causing the lower housing portion to separate from the middle housing portion to form a gap to enable gas contained within the headspace to enter the gap and exit through a second passageway between the upper housing portion and middle housing portion.

BRIEF DESCRIPTION OF THE DRAWINGS

The following drawings in which like reference characters indicate like parts are illustrative of embodiments of the invention and are not intended to limit the invention as encompassed by the description provided in the specification or the claim forming part of the application.

DETAILED DESCRIPTION OF THE INVENTION

The wine preserving assembly of the present invention provides for the simultaneous injection of an inert gas into the headspace of a wine bottle and the evacuation of existing gas (e.g. air) within the headspace to provide an non-reactive atmosphere in proximity to the wine contained in the wine bottle regardless of the amount of wine. The wine preserving assembly allows for the simultaneous injection and evacuation of gas without awkward or multiple step operations or the use of difficult to handle equipment.

Figure 1:
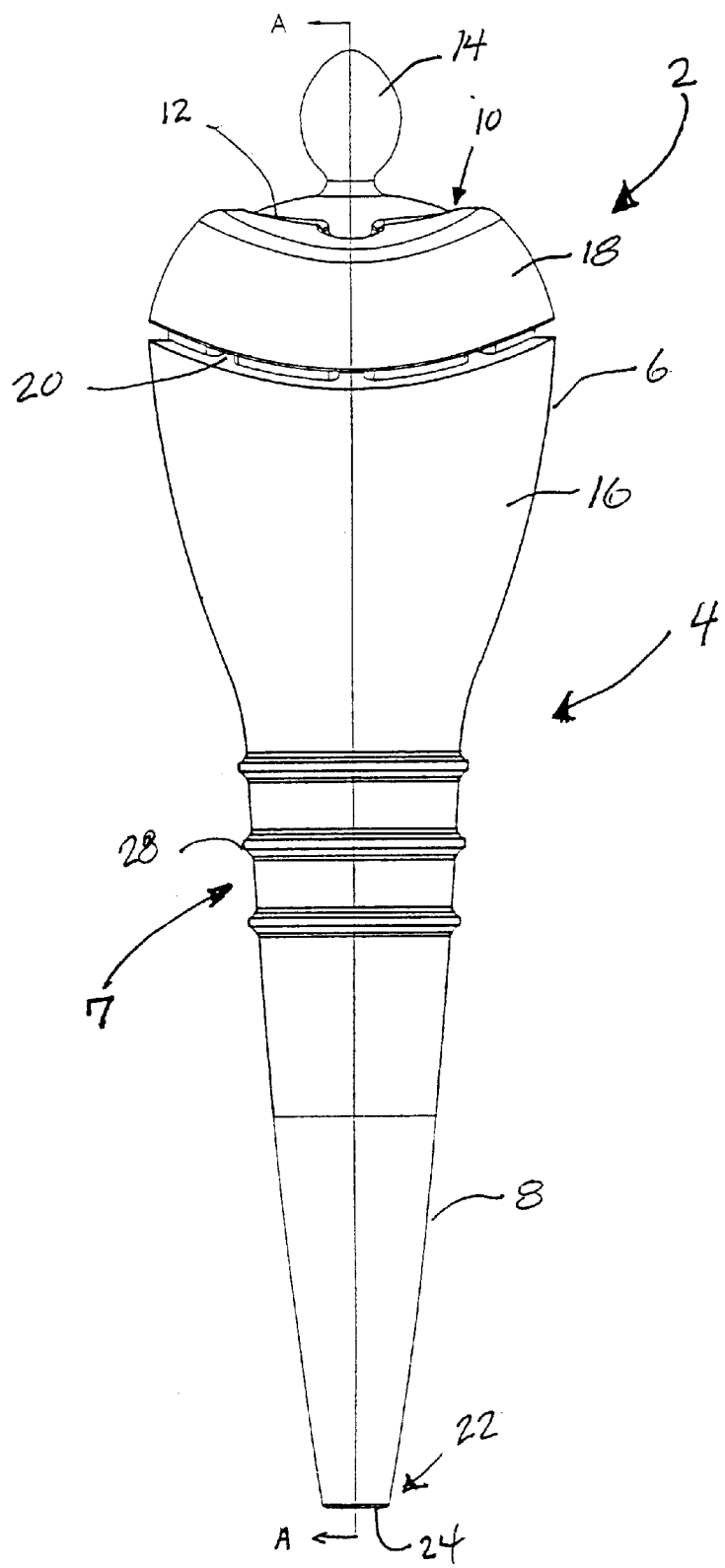
FIG. 1 is a front view of an embodiment of a wine preserving assembly in accordance with the present invention.
Figure 2:
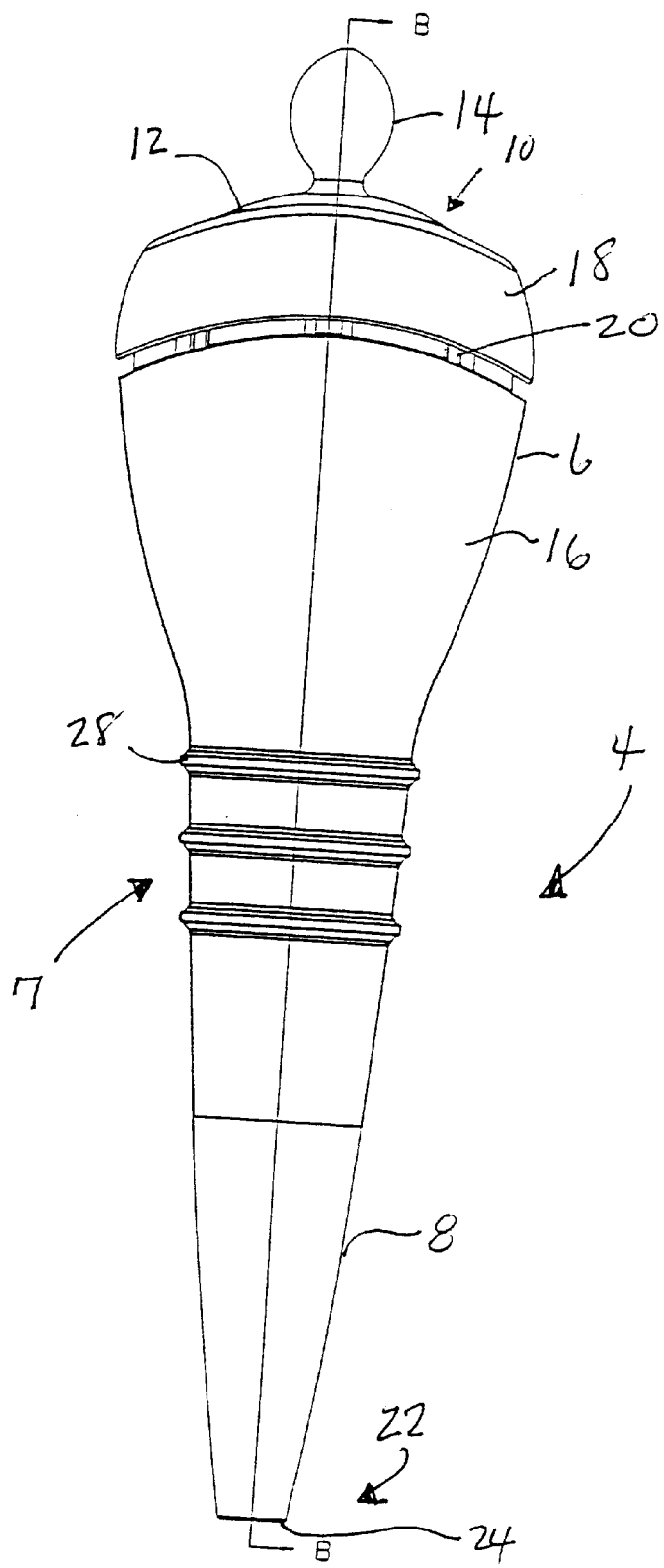
FIG. 2 is a rear view of the wine preserving assembly shown in FIG. 1.

Referring to FIGS. 1 and 2 there is shown an embodiment of the present invention in the form of a wine preserving assembly 2 comprising a housing 4 having an upper housing portion 6, a middle housing portion 7, and a lower housing portion 8. The upper housing portion 6 comprises a top end 10 having an opening 12 for receiving an inert gas delivery assembly which may be in the form of an inert gas cannister 13 (see FIG. 3) having an end which is adapted to enter the opening 12 and be secured within the upper housing portion 6 to provide a supply of inert gas to the wine bottle (not shown) through the wine preserving assembly 2. As shown specifically in FIGS. 1 and 2, when the inert gas delivery assembly 2 is not operatively connected to the wine preserving assembly 2, the opening 12 may be protected by a stopper 14 positioned therein which serves to prevent dust, air and the like from entering the wine preserving assembly 2.

The upper housing portion 6 includes a lower portion 16 and an upper portion 18 which are, in part, separated from each other by one or more laterally extending passageways 20 which enable a gas contained within the headspace of the bottle (e.g. air) to be evacuated from the bottle when an inert gas is delivered to the headspace as explained in detail hereinafter.

The lower housing portion 8 has a tapered profile which is particularly suited for entering the neck of a wine bottle and being releasably secured therein. The bottom end 22 of the lower housing portion 8 has an opening 24 therein which enables an inert gas to be injected into the headspace of the bottle while evacuating gas that may be present therein (e.g. air). In addition, the lower housing portion 8 is reversibly separated from the middle housing portion 7, as explained hereinafter, to provide an exitway for the evacuation of gas from the headspace.

Between the upper housing portion 6 and the lower housing portion 8 is the middle housing portion 7 which can optionally employ one or more annular rings 28 (three are shown) preferably formed of a flexible material (e.g. rubber) which serves to releasably secure the wine preserving assembly 2 in the neck of the bottle. The employment of a flexible material enables the wine preserving assembly 2 to be secured in the neck of the bottle in an airtight manner when injection of an inert gas is desirable and also provides easy removal of the wine preserving assembly 2 when its function is no longer required.

The wine preserving assembly 2 of the present invention performs two functions simultaneously. First, an inert gas is injected into the headspace of a bottle while the gas contained therein (e.g. air) is simultaneously evacuated. As a result, the headspace of a wine bottle can be provided with an inert gas while safely removing undesirable gas (e.g. air) therefrom. In a further feature of the present invention and as explained hereinafter, the insertion of the inert gas cannister into the opening 12 and its operative engagement to the wine preserving assembly 2 triggers the simultaneous injection and evacuation of the respective gases without having the consumer operate a separate triggering mechanism such as an on/off switch and the like.

Figure 3:
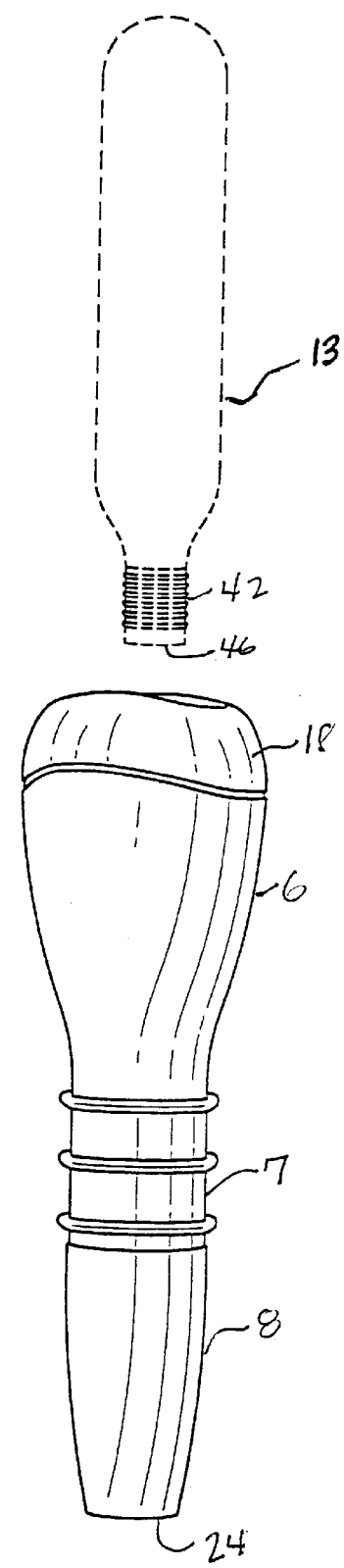
FIG. 3 is a side elevational view of the wine preserving assembly shown in FIGS. 1 and 2 with an inert gas cannister in position to be operatively connected to the wine preserving assembly.
Figure 4:
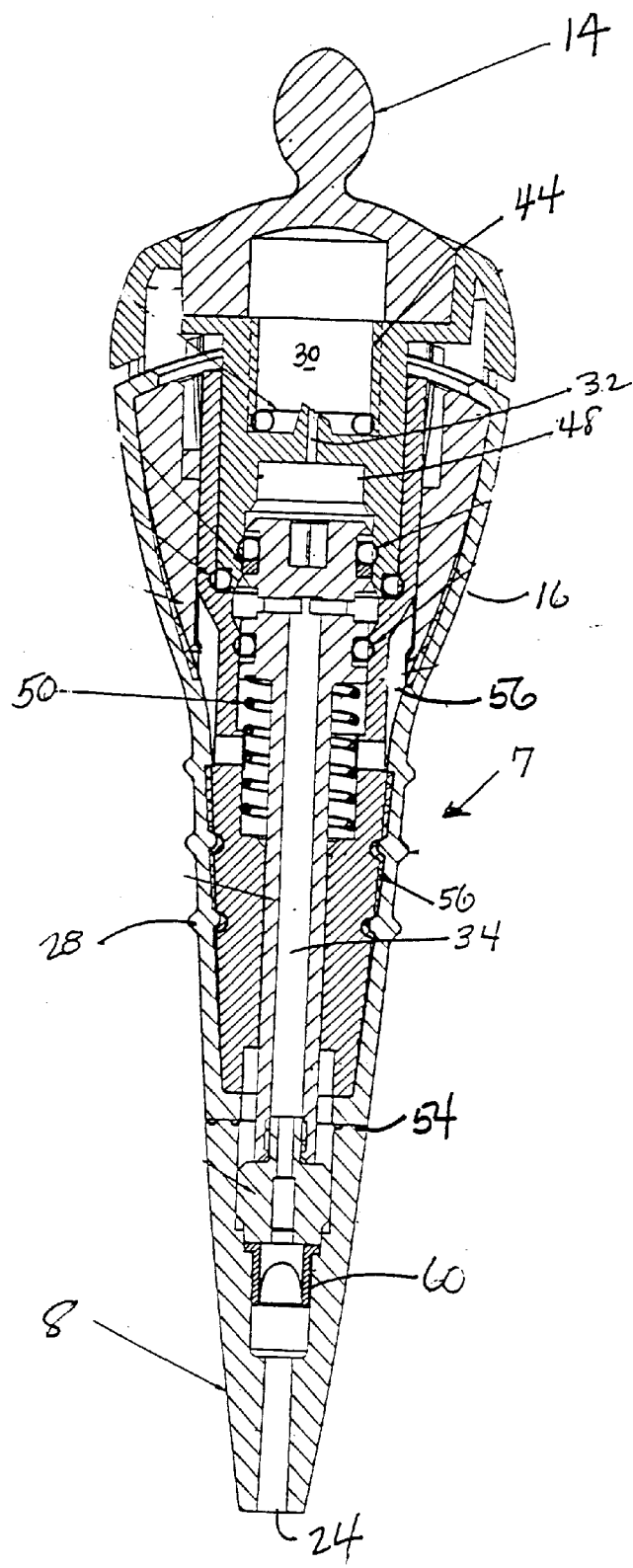
FIG. 4 is a cross-sectional view of the wine preserving assembly of FIG. 1 taken through Line A—A.
Figure 5:
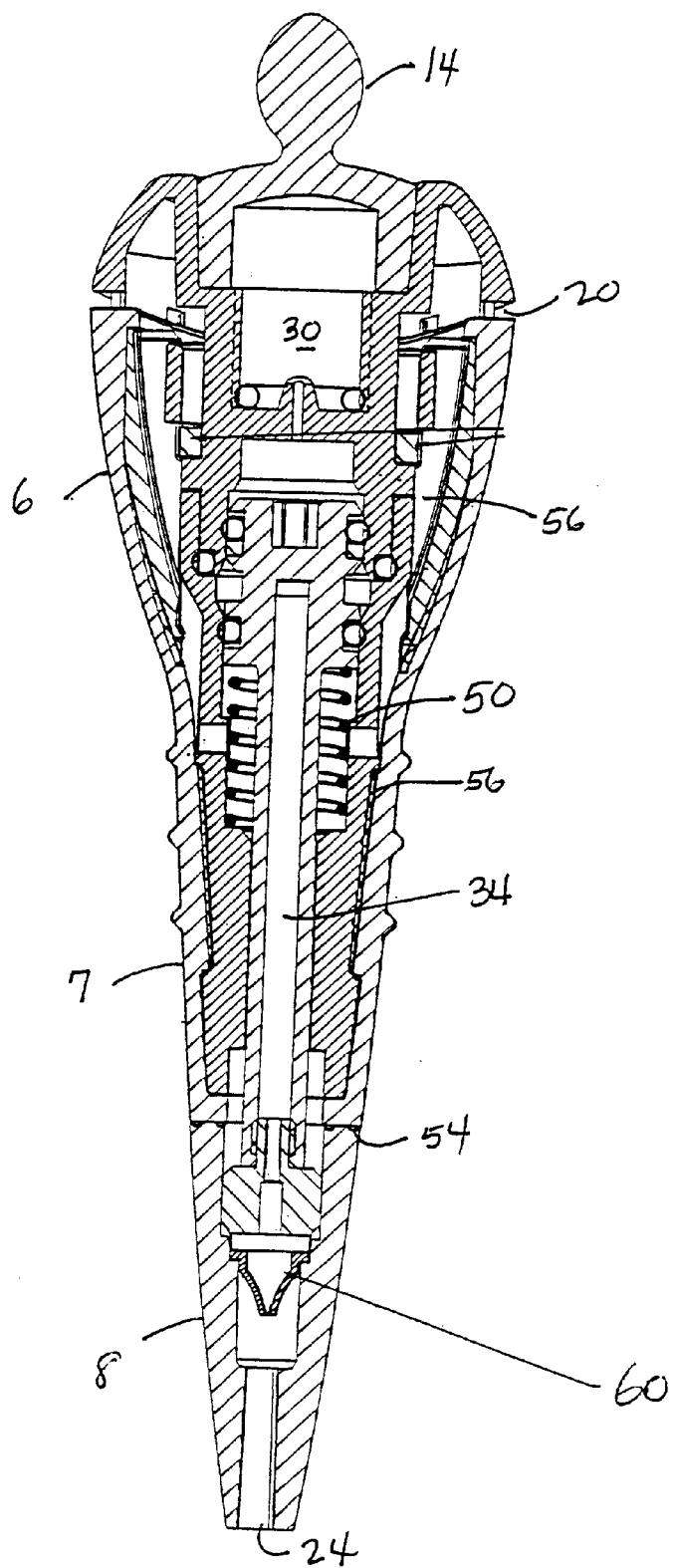
FIG. 5 is a cross-sectional view of the wine preserving assembly shown in FIG. 2 taken through Line B—B.

Referring to FIGS. 4 and 5, the wine preserving assembly 2 has an opening 12 in the top end 10 which is adapted to receive an inert gas delivery assembly such as an inert gas-containing cannister 13 as shown in FIG. 3. The end of the cannister 13 is insertable into a cavity 30, for example, by press fitting or by a screw-thread arrangement. For example, the end of the cannister 13 may be provided with threads 42 which may be engaged to corresponding grooves 44 within the cavity 30. The cannister has an end 46 having therein a pin-penetratable membrane or sheath (not shown) which can be penetrated by a pin contained within the housing 4 to provide a fluid connection. In particular, there is provided within the upper housing portion 6 a hollow pin 32 which is adapted to enter the end 46 of the inert gas cannister 13 through the sheath when the cannister 13 is secured within the cavity 30 and thereby provide a fluid connection for the flow of inert gas from the cannister 13 into a passageway downwardly through the wine preserving assembly 2 and eventually out of the opening 24 at the bottom end thereof into the wine bottle.

In accordance with the present invention, the inert gas from the cannister 13 or other source is provided to the headspace of the wine bottle at the same time air or other gas contained therein is evacuated from the headspace. As a result, the pressure within the wine bottle is maintained at a safe level and an inert gas environment is provided in contact with the upper surface of the wine contained within the bottle. The present invention provides that the act of securing the inert gas-containing cannister 13 within the cavity 30 of the top end 10 of the wine preserving assembly 2 serves to both supply the inert gas to the wine bottle and at the same time evacuate gas contained within the headspace out of the wine bottle. This feature of the present invention is accomplished by causing the pressure of the inert gas to activate an evacuation system which provides an evacuation pathway from the headspace through a gap formed between the lower housing portion 8 and the middle housing portion 7 bottle.

Referring to FIGS. 4 and 5, the wine assembly 2 is shown with a protective stopper 14 in place to protect against dust and like. Once the stopper 14 is removed, an inert gas cannister 13 is inserted into the opening 12 to releasably fit within the cavity 30 through a thread and groove connection or the like. In a preferred operation, the cannister 13 is provided with threads 42 which secure the cannister 13 within the cavity 30 through corresponding grooves 44 contained therein within about two turns. A further turn of the cannister 13 causes the end 46 of the cannister to contact the pin 32 and thereby pierce the sheath within the end 46 to establish flow communication of the inert gas from the cannister 13 through the pin 32.

The inert gas comes into contact with a piston assembly 48 which is seated downward within the upper housing portion 6. The pressure of the inert gas forces the piston assembly 48 against the upward bias of a spring assembly 50. During this process, the inert gas flows through an opening 54 and into the chamber 34 which provides a passageway for the flow of the inert gas out of the opening 24 at the bottom of the wine preserving assembly 2.

The pressure placed on the piston assembly 48 causes the lower housing portion 8 to separate from the middle housing portion 7 thereby causing a gap 54 between the same. The gap 54 provides an exit for the gas contained within the headspace. Gas contained within the head space of the wine bottle therefore rises upwardly around the lower housing portion 8 and enters the gap 54 where it follows a pathway 56 until it reaches the laterally extending passageway 20 which lies above the neck of the bottle. Thus, the present invention provides for the simultaneous injection of an inert gas and the use of the pressure generated by the inert gas to operate a piston assembly to separate the lower housing portion 8 from the middle housing portion 7 to thereby provide a pathway 56 for the simultaneous evacuation of gas (e.g. air) contained within the headspace of the bottle. The user of the wine preserving assembly 2 of the present invention therefore does not operate a separate trigger assembly to activate the inert gas injection or the evacuation of gas from the wine bottle.

The wine preserving assembly 2 also provides a device 60 contained within the lower housing portion 8 which prevents wine from the wine bottle from reentering the pathway 34 such as might occur if the wine bottle were accidently overturned. One such device suitable for this purpose is a one-way valve or check valve known to those of ordinary skill in the art.

What is claimed is:

1. In a particular aspect of the present invention, there is provided a wine preserving assembly comprising:

a) a housing having a lower housing portion, a middle housing portion and an upper housing portion, said lower housing portion being insertable into the neck of a wine bottle;

b) said upper housing portion having an opening for releasably receiving an inert gas-containing vessel and being separated from the middle housing portion by at least one pathway;

c) a pin adapted to penetrate the inert gas-containing vessel and to deliver the insert gas to a piston assembly;

d) a first passageway for delivering at least a portion of the inert gas from the piston assembly through an opening in the lower housing portion; and e) said piston assembly upon contact with the inert gas, moving to a position causing the lower housing portion to separate from the middle housing portion to form a gap to enable gas contained within the headspace to enter the gap and exit through a second passageway between the upper housing portion and middle housing portion.

* * * * *